United States Patent
Lin

(10) Patent No.: US 7,042,511 B2
(45) Date of Patent: May 9, 2006

(54) APPARATUS AND METHOD FOR VIDEO DATA PROCESSING IN DIGITAL VIDEO DECODING

(75) Inventor: Tzu-Ping Lin, Pingtung (TW)

(73) Assignee: Mediatek Inc., Hsin-Chu (TW)

( * ) Notice: Subject to any disclaimer, the term of this patent is extended or adjusted under 35 U.S.C. 154(b) by 520 days.

(21) Appl. No.: 10/310,239

(22) Filed: Dec. 5, 2002

(65) Prior Publication Data
US 2003/0113102 A1   Jun. 19, 2003

(30) Foreign Application Priority Data
Dec. 13, 2001   (TW) .............................. 90130973 A

(51) Int. Cl.
  *H04N 7/01*    (2006.01)
  *H04N 5/45*    (2006.01)
(52) U.S. Cl. ...................... 348/445; 348/565; 348/584
(58) Field of Classification Search ........ 348/565–568, 348/445, 556, 453, 584; 386/33, 37, 34, 386/108, 109, 123
See application file for complete search history.

(56) References Cited

U.S. PATENT DOCUMENTS

| | | | |
|---|---|---|---|
| 5,369,444 A | * | 11/1994 | Ersoz et al. ................. 348/598 |
| 5,923,379 A | * | 7/1999 | Patterson ..................... 725/70 |
| 6,414,996 B1 | * | 7/2002 | Owen et al. ........... 375/240.17 |
| 6,678,006 B1 | * | 1/2004 | Velez et al. ................. 348/564 |

* cited by examiner

*Primary Examiner*—Victor R. Kostak
(74) *Attorney, Agent, or Firm*—Thomas, Kayden, Horstemeyer & Risley

(57) ABSTRACT

An apparatus and method for video data processing in digital video decoding, such as digital video disk (DVD) decoding, which produces new video data according to main picture data, sub-picture unit (SPU) data, and an aspect ratio. The apparatus includes a sub-picture-unit-decoding and color-determining device, a mixer, a buffer, and an interpolator. The sub-picture-unit-decoding and color-determining device is used for performing sub-picture decoding and color determination on the SPU data, and producing decoded SPU data. The mixer, coupled to the SPU-decoding and color-determining device, is employed to mix the main picture data and the decoded SPU data, and outputting combined video data. The buffer, coupled to the mixer, for storing the combined video data outputted from the mixer. The interpolator is used to receive the combined video data from the mixer and to read previously combined video data from the buffer, and to generate the new video data by performing an interpolation operation according to the aspect ratio, the combined video data, and the previously combined video data.

14 Claims, 4 Drawing Sheets

APPARATUS AND METHOD FOR VIDEO DATA PROCESSING IN DIGITAL VIDEO DECODING

This application incorporates by reference Taiwan application Ser. No. 090130973, filed on Dec. 13, 2001.

BACKGROUND OF THE INVENTION

1. Field of the Invention

The invention relates in general to an apparatus for video data processing and method therefor, and more particularly to an apparatus and a method for video data processing in digital video disk (DVD) decoding, capable of performing video-frame aspect-ratio conversion.

2. Description of the Related Art

In order to satisfy the consumers' demand for recording media with larger data capacity, as well as better video quality and convenience in utilization, a number of leading vendors and main developers joined together in 1996 to make the specification of a new recording medium—digital video disk (DVD) and expected the DVD to substitute for the conventional compact disc (CD). In the DVD specification, the physical size of a DVD is substantially equal to that of a CD, but the data capacity of a DVD is at least 7 times larger than that of a CD in the same physical size. According to the DVD specification, DVDs can record much more video data and are much more convenient for the consumers. In the DVD specification, the standard for video optical disks is designated as DVD-Video format. The DVD-Video format allows different video compression methods to be used in making DVDs. Particularly, moving picture experts group 2 (MPEG-2) is used as the video compression method. Because of DVDs' high data capacity, DVDs are not only recording media for video, but also versatile recording media. The scope of the DVD specification has been extended for audio recording media, writable recording media, multiple rewritable and writable media, and the corresponding standards and products for DVD-Audio, DVD-ROM, DVD-RAM are accordingly made.

Regarding playing a video, a user may notice that a DVD processing device, such as a DVD player, has a special function of adjusting the aspect ratio of the video for different display modes. That is, a display device for displaying the video has its specific aspect ratio, for example, an aspect ratio of 4:3, and may be different from the video source, for example, a 16:9 video. The video, in this case, can be scaled for the aspect ratio of the display device by performing specific video data processing in decoding, called scaling. In brief, after decoding, the output video to the display device has been scaled up or down. In addition, DVD players generally provide different aspect ratio display modes so as to correspond to different display devices' aspect ratio.

Another feature of the DVD-Video format is the sub-picture system, which provides a variety of functions for users. Sub-pictures, such as subtitles, are conventionally superimposed on the video, referred to as main pictures, in a video compact disc (VCD). In contrast, DVD allows subtitles to be recorded as sub-pictures that are additionally encoded as a plurality of sub-picture units (SPUs) stored in a data stream, other than the MPEG-2 bit stream of the video. Hence, DVD-Video disc producers can take the advantages of DVD sub-picture system to design and create sub-pictures separately so as to provide the users with a variety of functions in terms of sub-pictures, for example, selection for subtitles or information in different languages, or an interactive operating environment with menus for interaction with the DVD player. A DVD-Video disc can provide at most 32 tracks, so subtitles in at most 32 languages can be provided. In addition, the user can optionally turn on or off the sub-pictures, as well as select colors of the sub-pictures, through the DVD player. However, the display colors in each sub-picture are limited to four colors since the palette information allocated to a sub-picture is defined by a 2-bit data field.

When a video in DVD-Video format is displayed, the MPEG encoded video data is decoded as decoded video data containing the main pictures. If corresponding sub-pictures are turned on, SPU are decoded by an SPU decoding method as decoded SPU data containing the sub-pictures. The sub-pictures are further superimposed on the main pictures by video data processing. The bit stream read from a DVD is typically divided into different bit streams by a parser and these bit streams are fed into respective decoders for decoding with respect to their characteristics, such as video, audio, and SPU, and so on. For example, the parser identifies video, audio, and SPU bit streams and outputs the video bit stream to a video decoder, the audio bit stream to an audio decoder, and the SPU bit stream to an SPU decoder, respectively. In addition, the video decoder decodes the video bit stream as decoded video data while the SPU decoder decodes the SPU bit stream as decoded SPU data. The decoded SPU data is combined with the decoded video data so as to produce a combined signal in digital. A display encoder, such as a television encoder, then converts the combined signal into an analog display signal so as to display the video, for example, on a television set.

As mentioned above, a DVD player provides different video scaling modes corresponding to aspect ratios for different display devices, and the output video signal to the display devices are scaled up or down by a scaling process. For example, when a 16:9 video stored in a DVD-Video disc is intended to be displayed on a television compliant to National Television Standards Committee (NTSC) system with an aspect ratio of 4:3, the DVD player needs to perform a scaling process on the video so as to display the full aspect of the video. It should be noted that scaling of the sub-pictures and the scaling of the main pictures are both required to be done so as to maintain the desired display quality of the sub-pictures in different scaling modes. If the scaling of the sub-pictures is not done or not properly done, the subtitles or texts in the menus of the sub-pictures may be distorted, thus degrading the display quality.

The SPU decoding, video scaling, the mixing of video and sub-pictures are conventionally done by a video data processing system shown in FIG. 1. The video data processing system in FIG. 1 has three main components: a video data scaling unit 10, an SPU decoding and scaling unit 20, and a video and sub-picture data mixer 190. In the conventional approach, the video data scaling unit 10 first performs a scaling process on MPEG-decoded video data, designated as VD, according to a preset scaling mode with interpolation, and then outputs scaled decoded video data, piece by piece. The SPU decoding and scaling unit 20, on the other hand, receives the SPU bit stream (designated as SB), performs the SPU decoding of the SPU bit stream, scales decoded SPU data by interpolation according to the aspect ratio of the scaling mode settings, and then outputs scaled decoded SPU data, piece by piece. The video and sub-picture data mixer 190 then combines the scaled decoded video and the scaled decoded SPU data so as to the required combined signal.

In the video data processing system shown in FIG. 1, the decoded video data as well as the decoded SPU data is processed on a horizontal line basis. In addition, the scaling of the main pictures and the scaling of sub-pictures are based on interpolation. For example, the scaling up of the main pictures by interpolation is performed based on every two adjacent horizontal lines of a current main picture. After interpolation, the video data of a new horizontal line is generated and is arranged between the two adjacent horizontal lines in a new frame, wherein the video data of the new horizontal line is based on a weighted sum of the video data of two adjacent horizontal lines. Suppose that $VD_{k-1}$ and $VD_k$ represent video data of a (k−1)th and kth horizontal lines respectively. In the case of scaling up the current main picture, the video data of the new horizontal line can be determined by $VD_{k-1} \times W1 + VD_k \times W2$, where W1 and W2 are weights. The weights can be changed according to the requirements for the scaling modes to scale up or scale down the video frames.

Since the scaling of the video and sub-pictures is done by using interpolation, the video data scaling unit 10 and the SPU decoding and scaling unit 20 each include two buffers and one interpolator. These buffers serve as first-in first-out queues (FIFOs).

The video data scaling unit 10 includes a video data buffer 110, a video data backup buffer 120, and a video data interpolator 130. The video data buffer 110 is used for receiving decoded video data (VD) from an MPEG video decoder (not shown). The decoded video data outputted by the MPEG video decoder can be temporarily stored in a dedicated memory and then a piece of the video data, possibly representing a complete horizontal line or a segment of a horizontal line of a current video frame, is read from the dedicated memory to the video data buffer 110 for use in scaling. The video data backup buffer 120 is employed to store the decoded video data with respect to a previous horizontal line of the current video frame. With the video data backup buffer 120, the video data interpolator 130 can read the decoded video data with respect to two adjacent horizontal lines during interpolation, and does not need to read the video data of the previous horizontal line from the dedicated memory for the MPEG video decoder again. The video data backup buffer 120, thus, is required to have data capacity for storing video data of a whole horizontal line. The video data buffer 10, on the other hand, is not required to have the capacity of storing video data of a whole horizontal line. For example, when the processing of current video data is almost complete, the video data of the next horizontal line is read from the dedicated memory to the video data buffer 110.

When the scaling of the video frame is performed, the video data buffer 110 provides video data $VD_k$ of a current line segment while the video data backup buffer 120 provides video data $VD_{k-1}$ of a previous line segment adjacent to the current horizontal line segment. The video data $VD_k$ and $VD_{k-1}$ are simultaneously fed into the video data interpolator 130. In this way, the video data interpolator 130 performs interpolation to determine the video data of the line segment to be inserted between the two adjacent line segments as $VD_{k-1} \times W1 + VD_k \times W2$.

Referring to FIG. 1, the SPU decoding and scaling unit 20 includes an SPU buffer 140, an SPU decoder 150, an SPU backup buffer 160, an SPU palette device 170, and an SPU interpolator 180. Each SPU includes pixel data of the sub-pictures, and the pixel data is run-length coded (RLC). The SPU decoder 150 performs SPU decoding on an SPU bit stream (SB). The SPU decoder 150 outputs pixel data of a line segment of a current sub-picture to the SPU backup buffer 160 in the form of corresponding color codes. The SPU palette device 170 receives the color codes from the SPU decoder 150 and generates color data in Y/Cr/Cb component video signal format. Meanwhile, the SPU palette device 170 also receives color codes of the previous line segment of the current sub-picture from the SPU backup buffer 160, and generates the corresponding color data corresponding to the current line segment and the previous line segment to the SPU interpolator 180. Further, the SPU buffer 140 is employed in the SPU decoding and scaling unit 20 to adjust the data flow of the SPU bit stream to the processing capability of the SPU decoder 150, wherein the SPUs in the SPU bit stream are fed into the SPU decoder 150 piece by piece. When the sub-pictures are to be scaled up, the SPU palette device 170 outputs the color data $SD_k$ and $SD_{k-1}$ respectively containing the information of the current line segment and the previous line segment. The SPU interpolator 180 receives the color data $SD_k$ and $SD_{k-1}$ simultaneously and performs interpolation according to the preset scaling mode above to determine a new line segment to be inserted between the two adjacent line segments (i.e. the current and the previous line segments) as $SD_{k-1} \times W1 + SD_k \times W2$.

The required video data VS is finally obtained by mixing the output data of the video data interpolator 130 and the SPU interpolator 180 by the video and sub-picture data mixer 190.

As described above, in order to meet the needs of scaling for different display devices with different aspect ratios, the conventional video data processing system is used with the interpolation method to perform scaling of the video and the sub-pictures. Unfortunately, the video data processing system has the following disadvantages when implemented onto circuits. First, two individual backup buffers are required for the interpolation processing with respect to video and sub-pictures. Secondly, the SPU palette device is required to simultaneously convert two SPU color codes into color data. As a result, the SPU palette is generally implemented with either a conversion circuit operating at double frequencies with respect to the operating frequency of the video data processing system, or two conversion circuits operating together in parallel. Thirdly, two individual interpolators are required to perform interpolation for either video or sub-pictures. Thus, the circuit size and the manufacturing cost are increased.

SUMMARY OF THE INVENTION

It is therefore an object of the invention to provide an apparatus and a method for video data processing in digital video decoding, such as, digital versatile disc or digital video disc (DVD) decoding, so as to perform the scaling of the video and sub-pictures according to an aspect ratio. According to the invention, the corresponding circuit design is simplified significantly, thus resulting in reduced manufacturing cost of the total circuit.

The invention achieves the above-identified objects by providing an apparatus for video data processing in digital video decoding, such as digital video disk (DVD) decoding, which can generate new video data according to an aspect ratio, main picture data, and sub-picture unit (SPU) data. The apparatus includes a sub-picture-unit-decoding and color-determining device, a mixer, a buffer, and an interpolator. The sub-picture-unit-decoding and color-determining device is used for performing sub-picture decoding and color determination on the SPU data, and producing decoded SPU data. The mixer, coupled to the SPU-decoding and color-determining device, is employed to mix the main picture data and the decoded SPU data, and output combined video data. The buffer, coupled to the mixer, for storing the combined video data outputted from the mixer. The interpolator is used to receive the combined video data from the mixer and to read at least some previously combined video data from the buffer, and to generate the new video data by performing an interpolation operation according to the aspect ratio, the combined video data, and the piece of previously combined video data.

The invention achieves the above-identified objects by providing a method for video data processing in digital video decoding, to produce new video data by performing video-frame aspect-ratio conversion of main picture data and sub-picture unit (SPU) data according to an aspect ratio. The method includes the following steps. First, decoded SPU data is produced by performing sub-picture decoding on the SPU data. Secondly, combined video data is generated by mixing the main picture data and the decoded SPU data. The combined video data is then stored. Next, the combined video data is received and at least some previously combined video data is read and the new video data is generated by performing an interpolation operation according to the aspect ratio, the combined video data, and at least some previously combined video data. In addition, the step of producing the piece of decoded SPU data includes the steps of performing sub-picture decoding on the SPU data and producing the pixel data of a piece of the sub-picture in the form of corresponding color codes, and converting the color code into color data in the form of a plurality of color components in a Y/Cr/Cb component video signal format. Moreover, the method for video data processing can be used in DVD decoding, to produce new video data by performing video-frame aspect-ratio conversion of video data from a DVD.

The invention achieves the above-identified objects by providing a method for performing video-frame aspect-ratio conversion on a digital video data stream in digital video decoding, wherein the digital video data stream includes main picture data and sub-picture unit (SPU) data. The method includes the following steps. (a) Decoded SPU data is generated by performing sub-picture decoding on the SPU data. (b) Combined video data is generated by mixing the main picture data and the decoded SPU data. (c) The combined video data is stored. (d) The combined video data is received and at least some previously combined video data is read, and new video data is generated by performing an interpolation operation according to an aspect ratio, the combined video data, and at least some previously combined video data. (e) Steps (a) to (d) are repeated until all the video-frame aspect-ratio conversion is completed.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
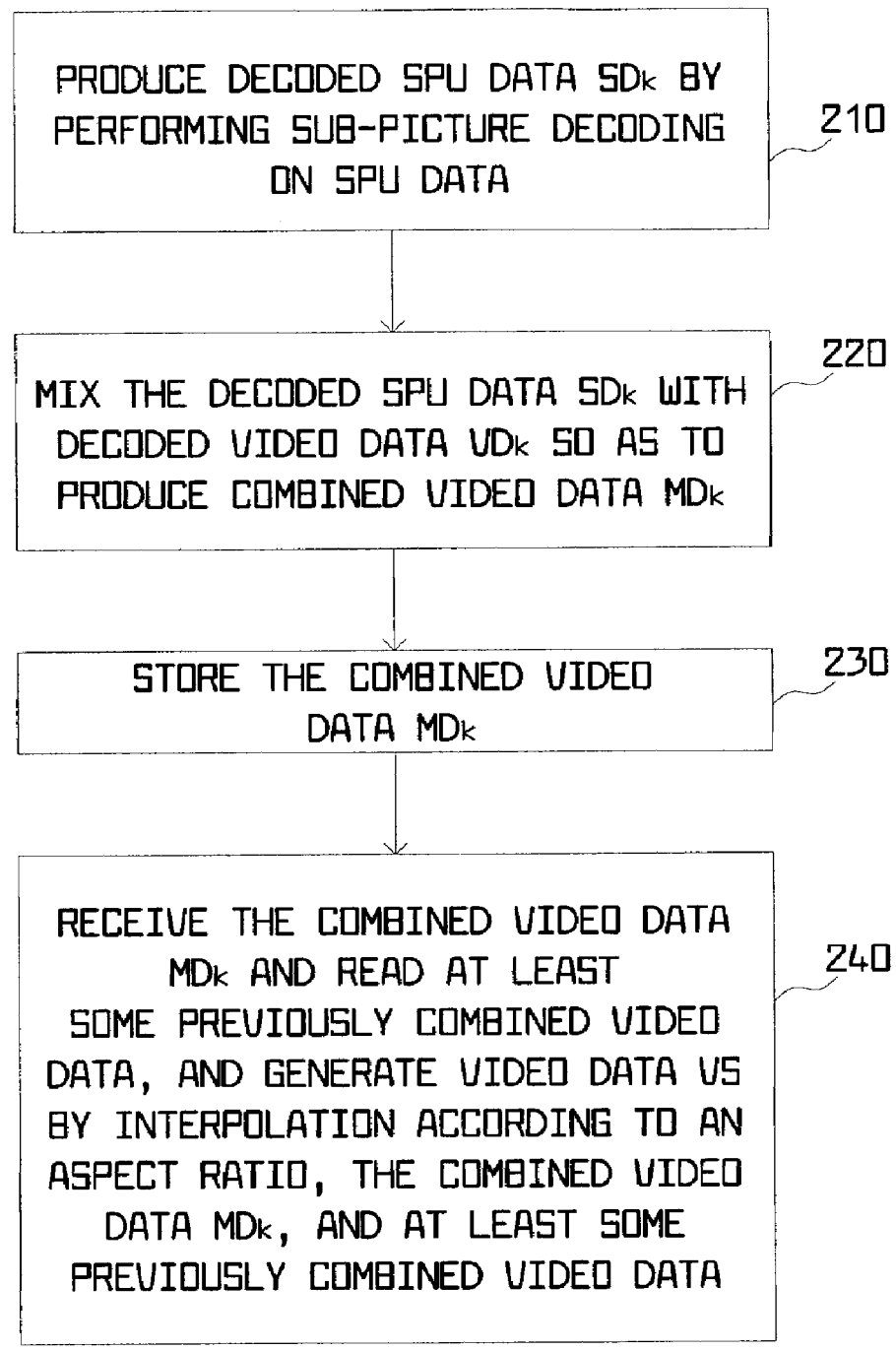
FIG. 2 is a flowchart of a method for video data processing according to a preferred embodiment of the invention.

A method for video data processing is illustrated in FIG. 2 according to a preferred embodiment of the invention. The method for video data processing is used in digital video decoding, such as digital versatile disc (DVD) decoding, to produce new video data by performing video-frame aspect-ratio conversion. The method includes the following steps.

First, the method begins and step 210 is executed to produce decoded SPU data, denoted as $SD_k$, by performing sub-picture decoding on SPU data, for example, from an SPU data stream. The decoded SPU data $SD_k$ is then mixed with decoded video data, denoted as $VD_k$, so as to produce combined video data, $MD_k$, as indicated in step 220. In step 230, the combined video data $MD_k$ is stored. Next, the combined video data $MD_k$ is received and at least some previously combined video data is read so as to generate the new video data (VS) by performing an interpolation operation according to an aspect ratio, the combined video data $MD_k$, and at least some previously combined video data, as indicated in step 240.

The above method is described in detail. In step 210, the SPU data, for example, from an SPU bit stream, may contain the data of a segment of a horizontal line, the data of a complete horizontal line, or the data of multiple horizontal lines. The sub-picture decoding will transform the SPU data into corresponding color codes. The color codes can be further converted into color data in the form of Y/Cr/Cb color components. The color code is a 2-bit value, for example 00, 01, 10, and 11. The color codes can respectively represent four colors selected from sixteen colors. Each color code represents one color composed of a plurality of color components in a component video signal format, for example, Y/Cr/Cb, according to the DVD-Video specification. That is, a 2-bit color code can be converted into color data in the form of Y/Cr/Cb color components.

In the video data processing method, video data of a main picture or sub-picture is processed on a horizontal line basis. A sub-picture may comprise a segment of a horizontal line, a complete horizontal line, or multiple horizontal lines. In step 220, the decoded video data $VD_k$ contains the data of a main picture to be reconstructed. The combined video data $MD_k$ is obtained by mixing the decoded video data $VD_k$ and the decoded SPU data $SD_k$, and can be expressed as follows:

$$MD_k = VD_k \times MP\_ratio + SD_k \times SPU\_ratio \quad \text{(Equation 1),}$$

where MP_ratio and SPU_ratio are coefficients adjustable.

In step 230, the combined video data $MD_k$ is stored for use in step 240. In step 240, the combined video data $MD_k$ is received and at least some previously combined video data is also read. For example, the previously combined video data produced in the previous round of video data processing in step 220, designated as $MD_{k-1}$, is stored in a buffer, and then in the step 230 of a current round the previously-stored combined video data $MD_{k-1}$ is read. Further, the new video data VS is generated by interpolation according to the aspect ratio, the combined video data $MD_k$, and the previously combined video data $MD_{k-1}$. For example, the new video data is produced by a weighted sum of the two adjacent horizontal lines as follows:

$$VS = MD_{k-1} \times weight_0 + MD_k \times weight_1 \quad \text{(Equation 2)},$$

where $weight_0$ and $weight_1$ are weights and can be adjusted according to the aspect ratio.

Assume that the data mixing method indicated by Equation 1 is employed in step 220. The Equation 2 can be expressed as:

$$\begin{aligned}
VS &= MD_{k-1} \times weight_0 + MD_k \times weight_1 \quad \text{(Equation 3)},\\
&= (VD_{k-1} \times \text{MP\_ratio} + SD_{k-1} \times \text{SPU\_ratio}) \times \\
&\quad weight_0 + (VD_k \times \text{MP\_ratio} + SD_k \times \\
&\quad \text{SPU\_ratio}) \times weight_1 \\
&= (VD_{k-1} \times weight_0 + VD_k \times weight_1) \times \\
&\quad \text{MP\_ratio} + (SD_{k-1} \times weight_0 + SD_k \times \\
&\quad weight_1) \times \text{SPU\_ratio} \\
&= \text{interpolated\_MP} \times \text{MP\_ratio} + \\
&\quad \text{interpolated\_SPU} \times \text{SPU\_ratio}
\end{aligned}$$

wherein the interpolated_MP represents the generated data of the interpolation for the decoded video data, and the interpolated_SPU represents the generated data of the interpolation for the decoded SPU data. Therefore, it can be shown that the video data signal VS produced according to the video data processing method of the invention can be substantially equal to the result by mixing the generated data of separately scaling the decoded video data and the decoded SPU data by interpolation according to the convention art of FIG. 1.

With respect to an input digital video data stream, such as a DVD-Video data stream, the steps of the video data processing method can be performed repeatedly while decoding the digital video data so as to perform video-frame aspect-ratio conversion according to different aspect ratio modes and produce the required video data. For example, when a movie video in a resolution of 720×480 pixels stored in a DVD-Video disc is expected to be displayed on a wide screen display (i.e. a 16:9 display), the decoded video data and the SPU data can be processed by the method according to the invention to produce required video data compliant with the aspect ratio of the wide screen display. In addition, any aspect ratio conversion, for example, the conversion based on aspect ratio display modes, such as panned or letterboxed modes defined in the DVD-Video specification, can be done according to the video data processing method of the invention.

Although the interpolation method described in the above embodiment is based on the video data of two adjacent horizontal lines in the main pictures and the pixel data of two adjacent horizontal lines in the sub-pictures, other interpolation methods can also be used to achieve the video-frame aspect-ratio conversion according to the spirit of the present invention. For example, an interpolation method based on three or more adjacent horizontal line can also be employed in the video data processing method of the invention to achieve video-frame aspect-ratio conversion.

Figure 3:
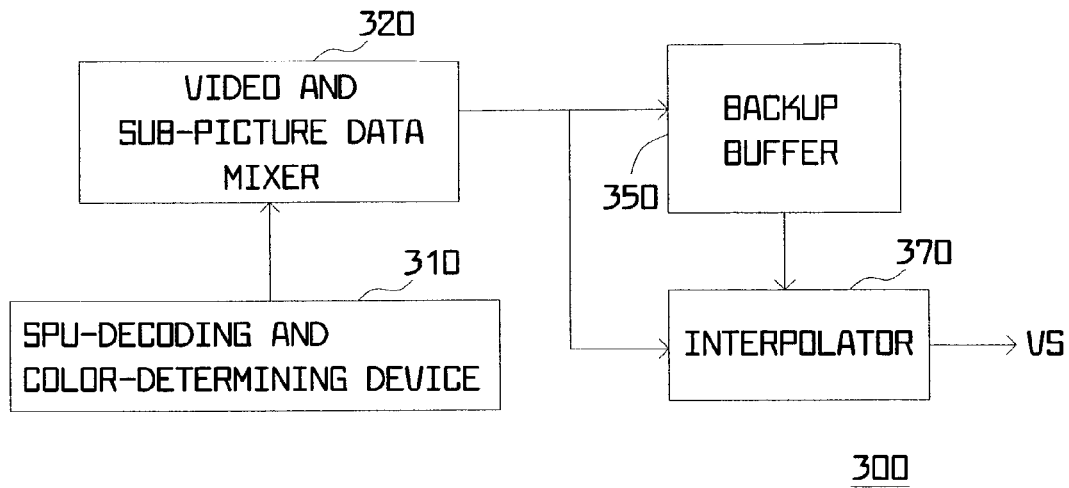
FIG. 3 is a block diagram illustrating an apparatus for video data processing according to the preferred embodiment of the invention.

FIG. 3 illustrates an apparatus for video data processing 300 according to a preferred embodiment. The video data processing apparatus 300 can be used in digital video decoding to produce new video data according to decoded video data, SPU data, and an aspect ratio in order to achieve video-frame aspect-ratio conversion. For example, in DVD decoding, the video data processing apparatus 300 can output new video data according to decoded video data, SPU data, and an aspect ratio so as to achieve DVD-video aspect-ratio conversion. The video data processing apparatus 300 includes an SPU-decoding and color-determining device 310, a mixer, a buffer, and an interpolator 370.

The SPU-decoding and color-determining device 310 is used for performing sub-picture decoding and color determination on SPU data so as to produce decoded SPU data.

The mixer, for example, a video and sub-picture data mixer 320 coupled to the SPU-decoding and color-determining device 310, as shown in FIG. 3, is used for mixing the decoded video data and the decoded SPU data, and outputting combined video data. The video and sub-picture data mixer 320 can be implemented by multipliers.

The buffer, for example, a backup buffer 350, is coupled to the video and sub-picture data mixer 320, and is employed to store the combined video data outputted from the video and sub-picture data mixer 320. The backup buffer 350 is used to supply the interpolator 370 with a copy of previously combined video data outputted from the video and sub-picture data mixer 320.

The interpolator 370 is used to receive the combined video data from the video and sub-picture data mixer 320 and to read previously combined video data from the backup buffer 350, and to generate the new video data by performing an interpolation operation according to the aspect ratio, the combined video data, and the previously combined video data.

The video data processing apparatus 300 shown in FIG. 3 is capable of being used as an apparatus for performing the video data processing method shown in FIG. 2. The SPU-decoding and color-determining device 310 can be employed to perform step 210. The video and sub-picture data mixer 320 can perform step 220. Step 230 can be achieved by the backup buffer 350. The interpolator 370 is capable of performing step 240. The video data processing apparatus 300 is therefore capable of being used in digital video decoding to produce new video data according to an aspect ratio, decoded video data, and SPU data in order to achieve video-frame aspect-ratio conversion. In addition, the video data processing apparatus 300 can also perform aspect-ratio conversion on the main pictures and the sub-pictures with other interpolation operations, thereby achieving the scaling of the video and the sub-pictures with respect to aspect ratios.

Figure 1:
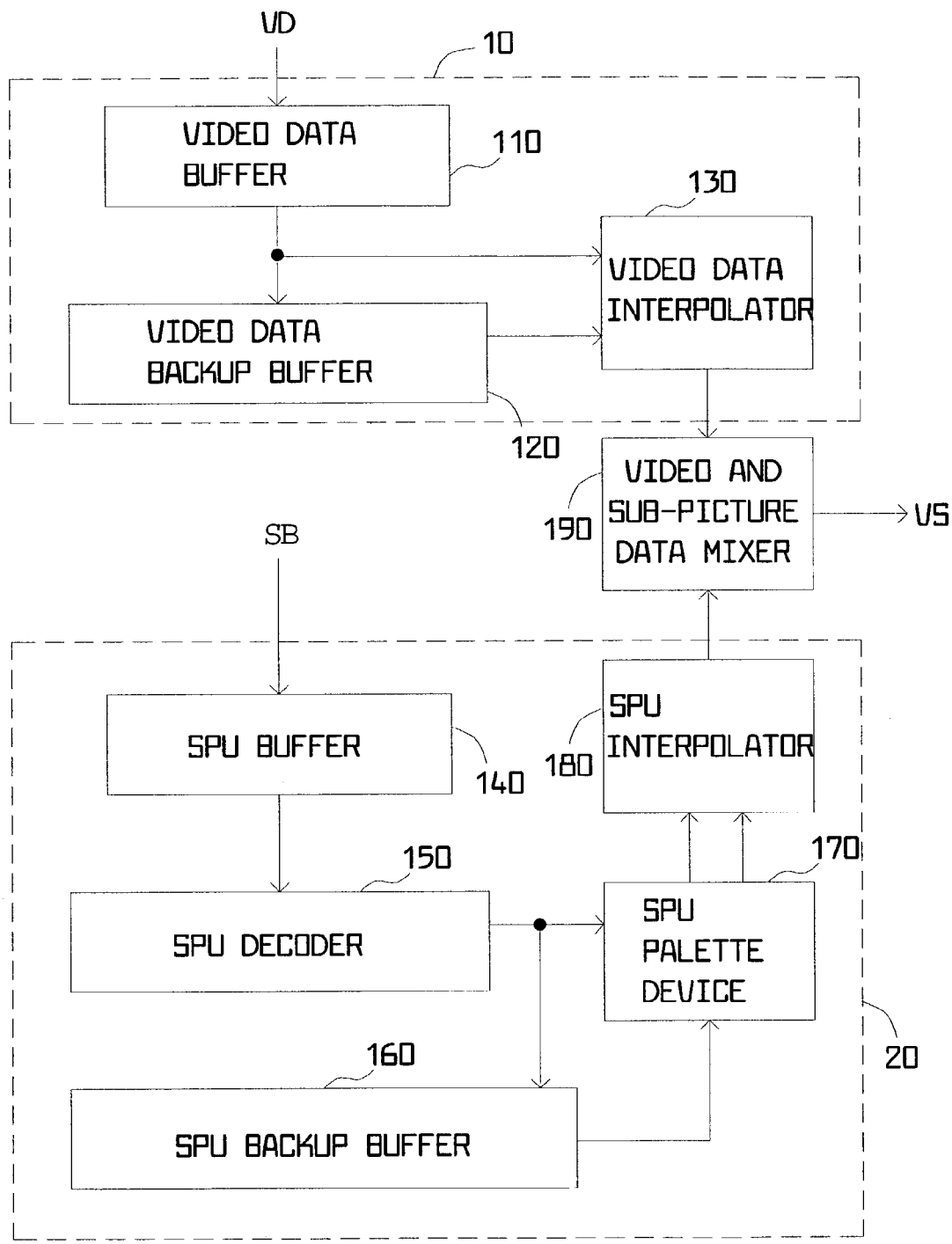
FIG. 1 (Prior Art) is a block diagram illustrating a conventional video data processing system for SPU decoding, video scaling, and video and sub-pictures mixing.

Moreover, the video data processing apparatus 300 makes a simplified circuit design possible, as compared with the conventional structure shown in FIG. 1. The video data processing apparatus 300 requires only one buffer, for example, the backup buffer 350, as shown in FIG. 3, to perform aspect-ratio conversions. On the contrary, two separate buffers are required in the conventional video data processing system in FIG. 1. Besides, the conventional structure shown in FIG. 1 requires two separate interpolators so as to support aspect-ratio conversions for the video and sub-pictures. The video data processing apparatus in this embodiment, on the other hand, needs only one interpolator, such as the interpolator 370 in FIG. 3. Because a reduced number of components are needed, the number of electrical connections is reduced in the circuit according to the invention. Thus, the overall circuit design and layout are significantly simplified, and the manufacturing cost is reduced.

Moreover, the SPU-decoding and color-determining device 310 includes a palette device. As described above, the SPU-decoding and color-determining device 310 produces the decoded SPU data, such as $SD_k$, by performing SPU decoding of the input SPU data, and then the video and sub-picture data mixer 320 receives the decoded SPU data $SD_k$ and combines it with the decoded video data $VD_k$ so as to produce the combined video data, such as $MD_k$. When the video and sub-picture data mixer 320 decodes the SPU data, the SPU data is first decoded into color codes corresponding to the pixels of the sub-pictures. The color codes need to be converted into corresponding color data in the form of Y/Cr/Cb color components. A palette device in the SPU-decoding and color-determining device 310 is used for performing such conversion. For example, the palette device can receive a color code corresponding to a pixel of the sub-picture, refer to a color look-up table, and generate the corresponding Y/Cr/Cb color components.

In FIG. 3, the palette device is integrated with the SPU-decoding. However, the palette device may also be a separate device. The palette device in such case can be connected with other components of the video data processing apparatus in different manners. The circuit structure and layout may thus become more flexible. Moreover, in the preferred embodiment only one set of color codes for the SPU data is required to be converted into Y/Cr/Cb color components at one time, while in the convention structure of FIG. 1 two sets of color codes must be simultaneously converted. Therefore, the palette device can be implemented by a simple circuit according to the invention, while the palette device in the convention structure of FIG. 1 must either operate at double frequencies or comprise two same converting circuits operating in parallel. The above-mentioned advantages of a simple palette device also applie to cases where the video data processing apparatus of the invention employs other interpolation methods, such as interpolation method based on three or more horizontal lines, to obtain interpolation with better precision. In brief, the video data processing of the invention has a much reduced complexity, as well as reduced implementation cost.

In the following, some examples for implementing the SPU-decoding and color-determining device are described.

Figure 4:
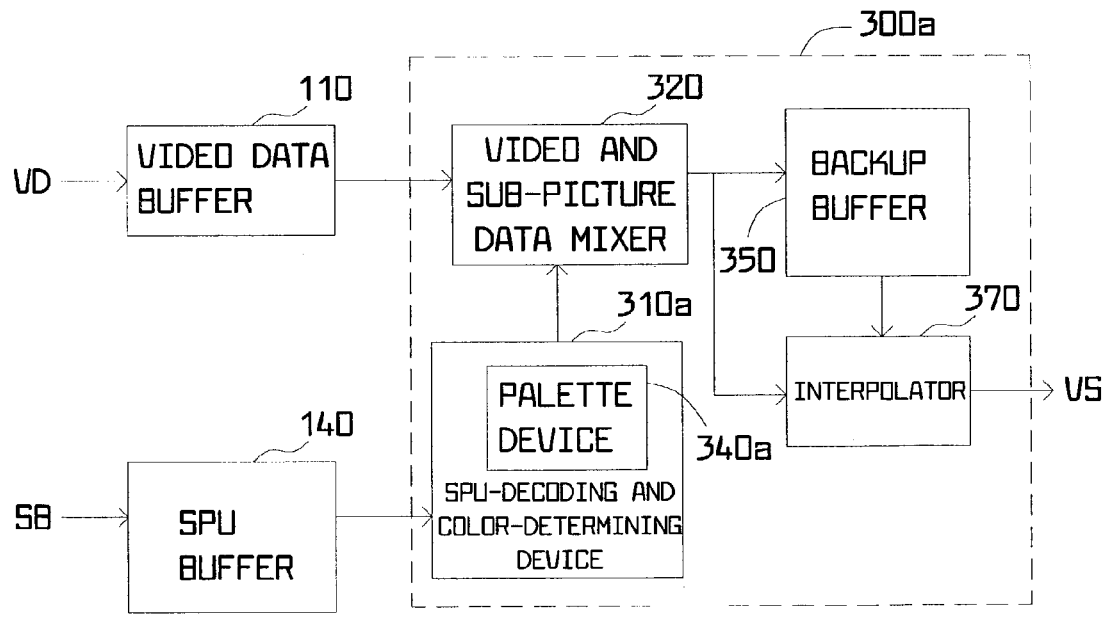
FIG. 4 is a first example of the video data processing apparatus in FIG. 3 according to the invention.

FIG. 4 is a first example of the video data processing apparatus in FIG. 3 according to the invention. A video data processing apparatus 300a includes an SPU-decoding and color-determining device 310a, a video and the sub-picture data mixer 320, a backup buffer 350, and an interpolator 370. The video data processing apparatus 300a, like the video data processing apparatus 300, is used for producing new video data according to an aspect ratio, main picture data, and SPU data.

In particular, the SPU-decoding and color-determining device 310a includes a palette device 340a. The SPU-decoding and color-determining device 310a is used to perform SPU decoding and color determination on the SPU data so as to generate decoded SPU data $SD_k$ representing the Y/Cr/Cb color components corresponding to each pixel of the sub-picture. The SPU-decoding and color-determining device 310a first decodes the SPU data into color codes corresponding to each pixel of the sub-picture. The palette device 340a further converts the color codes into Y/Cr/Cb color components. Hence, after decoding the SPU data, the Y/Cr/Cb color components corresponding to each pixel of the sub-picture are obtained.

In addition, a video data buffer 110 is employed in order to adjust the flow of the decoded video data VD into the video and sub-picture data mixer 320. The video data buffer 110 receives a portion of MPEG decoded video data VD, and outputs a piece of the MPEG decoded video data, such as $VD_k$, containing the data of a segment of a horizontal line or the data of a complete horizontal line of a main picture to the video and sub-picture data mixer 320. An SPU buffer 140 is used to adjust the flow of the SPU bit stream SB into the SPU-decoding and color-determining device 310a. The SPU buffer 140 receives the SPU bit stream and outputs a piece of SPU bit stream containing the data of a segment of a horizontal line or a complete horizontal line of a sub-picture to the SPU-decoding and color-determining device 310a.

The mixing of the decoded SPU data $SD_k$ and MPEG decoded video data $VD_k$ is then performed by the video and sub-picture data mixer 320. The video and sub-picture data mixer 320 outputs the combined video data $MD_k$ to the backup buffer 350. The backup buffer 350 stores the combined video data $MD_k$ for use in the interpolator 370. The interpolator 370 receives the combined video data $MD_k$ and reads at least one previously combined video data, for example, $MD_{k-1}$, from the backup buffer 350 so as to perform an interpolation operation to produce the new video data VS according to the aspect ratio, the combined video data $MD_k$, and at least the previously combined video data $MD_{k-1}$. Since the interpolator 370 may need to perform interpolation on the data contained in a same horizontal line of a same picture, the backup buffer 350 is required to have the capacity for storing a whole horizontal line of video data, for example, 720×8×2 bits.

Figure 5:
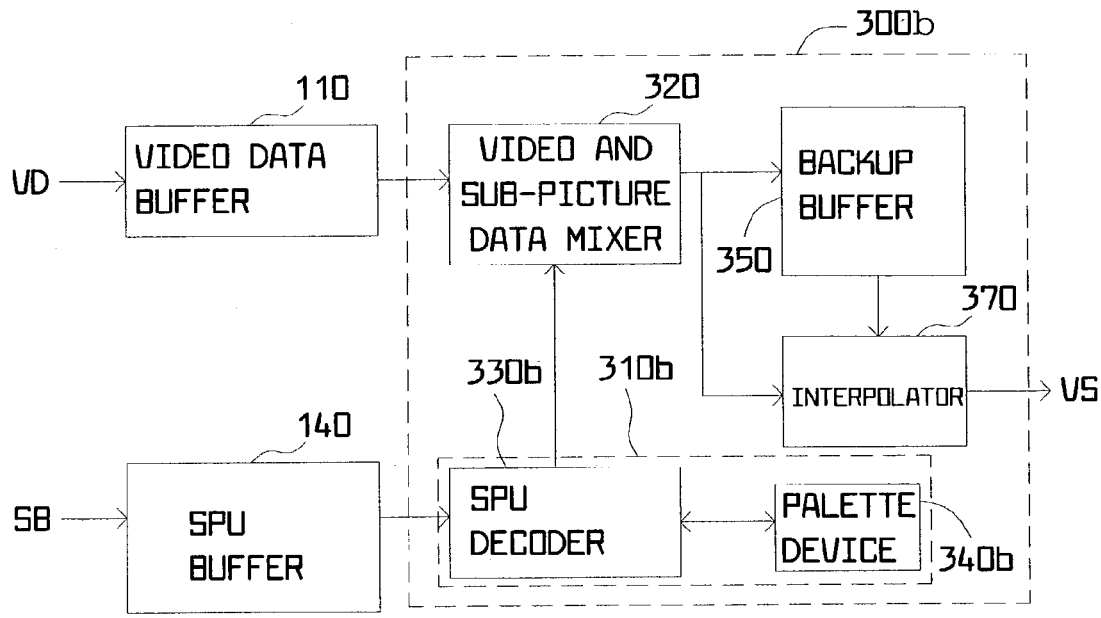
FIG. 5 is a second example of the video data processing apparatus in FIG. 3 according to the invention.

FIG. 5 is a second example of the video data processing apparatus in FIG. 3 according to the invention. A video data processing apparatus 300b includes an SPU-decoding and color-determining device 310b, a video and sub-picture data mixer 320, a backup buffer 350, and an interpolator 370. A video data buffer 110 and an SPU buffer 140 are employed also in order to adjust the flow of decoded MPEG video data and SPU bit stream, respectively. The video data processing apparatus 300b, like the video data processing apparatus 300, is used for producing new video data according tomain picture data, SPU data, and an aspect ratio.

The SPU-decoding and color-determining device 310b is used to perform SPU decoding and color determination on the SPU data so as to generate a decoded SPU data $SD_k$ representing the Y/Cr/Cb color components corresponding to each pixel of the sub-picture. Unlike the SPU-decoding and color-determining device 310a in the first example described above, the SPU-decoding and color-determining device 310b includes an SPU decoder 330b and a palette device 340b. The SPU decoder 330b is coupled to the video and sub-picture data mixer 320 and is used for performing SPU decoding on the SPU data so as to decode the SPU data into color codes corresponding to pixels of the sub-picture. The palette device 340b is coupled to the SPU decoder 330b, and is used to further convert the color codes into Y/Cr/Cb color components. The operation and the other components of the video data processing apparatus 300b are similar to that of the first example and will not be described for the sake of brevity.

Figure 6:
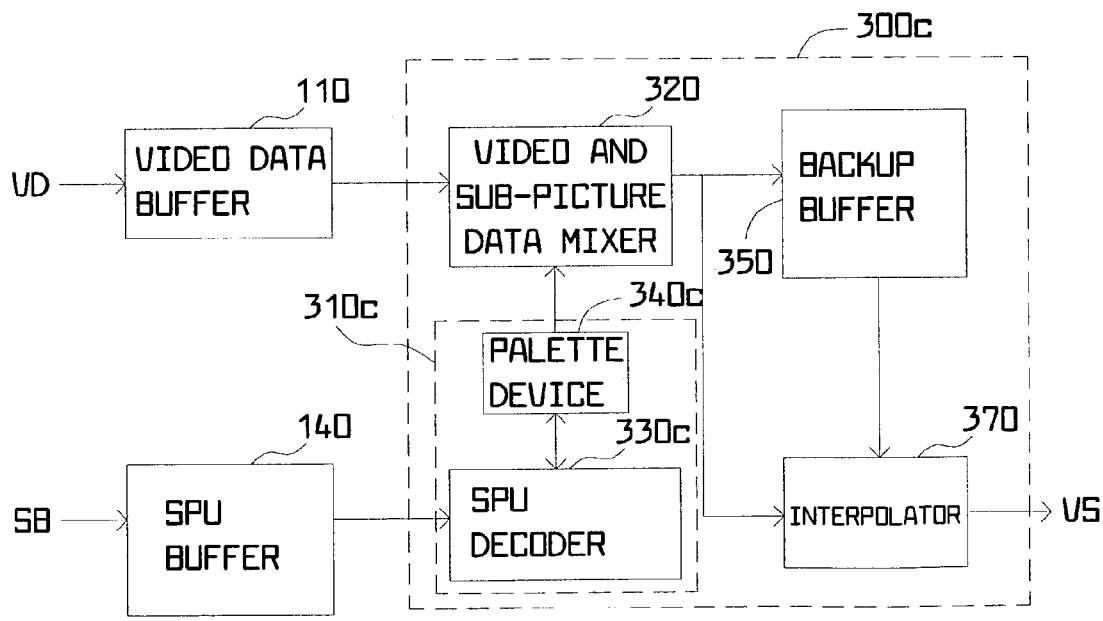
FIG. 6 is a third example of the video data processing apparatus in FIG. 3 according to the invention.

FIG. 6 is a third example of the video data processing apparatus in FIG. 3 according to the invention. A video data processing apparatus 300c includes an SPU-decoding and color-determining device 310c, a video and sub-picture data mixer 320, a backup buffer 350, and an interpolator 370. A video data buffer 110 and an SPU buffer 140 are employed to adjust the flow of decoded MPEG video data and SPU bit stream, respectively. The video data processing apparatus 300c, like the video data processing apparatus 300, is used for producing new video data according to main picture data, SPU data, and an aspect ratio.

The SPU-decoding and color-determining device 310c is used to perform SPU decoding and color determination on the SPU data so as to output a decoded SPU data signal containing decoded SPU data, for example, data $SD_k$ representing the Y/Cr/Cb color components corresponding to pixels of the sub-picture. The SPU-decoding and color-determining device 310c includes an SPU decoder 330c and a palette device 340c. The palette device 340c, unlike the one in the SPU-decoding and color-determining device 310b in the second example, is coupled between the SPU decoder 330c and the video and sub-picture data mixer 320. The SPU-decoding and color-determining device 310c is used for performing SPU decoding of the SPU data so as to decode the SPU data into color codes corresponding to pixels of the sub-picture. The palette device 340c is used for converting the color codes into Y/Cr/Cb color components. The operation and the other components of the video data processing apparatus 300b are similar to that of the first example and will not be described for the sake of brevity.

The apparatus and method for video data processing, capable of being used in digital video decoding, for example, decoding for a DVD-Video disc, is disclosed as above to perform video-frame aspect-ratio conversion of the video and sub-picture, enabling video scaling arbitrarily.

The invention disclosed above is demonstrated to be advantageous with respect to the conventional structure. First, a fewer number of interpolators and backup buffers are required in the video data processing apparatus, resulting in a reduced number of electrical connections of the circuit. Thus, the circuit design and layout are significant simplified and the manufacturing cost can be reduced. Secondly, the circuit design and layout are flexible because the palette device in the video data processing apparatus can be coupled or integrated to other components in different ways. The video data processing apparatus, accordingly, can use a simpler circuit to implement the palette device other than the complex implementation, as illustrated in the conventional structure.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for video data processing in digital video decoding, which produces now video data according to an aspect ratio, main picture data, and sub-picture unit (SPU) data, the apparatus comprising:

an SPU-decoding and color-determining device for performing sub-picture decoding and color determination on the SPU data, and producing decoded SPU data, the SPU-decoding and color-determining device comprising:

an SPU decoder for performing sub-picture decoding on the SPU data, and producing sub-picture pixel data in the form of corresponding color codes; and a palette device, coupled to the SPU decoder, for converting the color codes into a plurality of color components in a video signal format, wherein the decoded SPU data is outputted in the form of the color components;

a mixer, coupled to the SPU-decoding and color-determining device, for mixing the main picture data and the decoded SPU data, and outputting combined video data;

a buffer, coupled to the mixer, for storing the combined video data outputted from the mixer; and an interpolator, connected to the mixer and the buffer, respectively, for receiving the combined video data from the mixer and reading previously combined video data from the buffer in order to perform an interpolation operation according to the aspect ratio, the combined video data, and the previously combined video data to generate the new video data.

2. The apparatus according to claim 1, wherein the decoded SPU data includes color codes which can be further converted into a plurality of color components in a component video signal format.

3. The apparatus according to claim 2, wherein the SPU-decoding and color-determining device comprises a palette device for converting the color codes into the color components.

4. The apparatus according to claim 3, wherein the component video signal format is Y/Cr/Cb component video signal format.

5. The apparatus according to claim 1, wherein the SPU decoder is coupled to the mixer and the palette device.

6. The apparatus according to claim 1, wherein the palette device is coupled to the SPU decoder and the mixer, and converts the color codes into a plurality of color components in a component video signal format.

7. The apparatus according to claim 1, wherein the digital video decoding is digital video disk (DVD) decoding, and the main picture data and the SPU data are from a digital video disk.

8. The apparatus according to claim 1, wherein the new video data is generated by the interpolation operation using a weighted sum of the combined video data received from the mixer and the previously combined video data read from the buffer, and the combined video data and the previously combined video data have respective weighs that arc adjustable according to the aspect ratio.

9. The apparatus according to claim 8, wherein the combined video data received from the mixer is outputted according to a weighted sum of the main picture data and the decoded SPU data, and the main picture data and the decoded SPU data have respective weighs that are adjustable.

10. A method for processing video data in digital video decoding, to produce new video data by performing video-frame aspect-ratio conversion of main picture data and sub-picture unit (SPU) data according to an aspect ratio, the method comprising the following steps:

(a) producing decoded SPU data by performing sub-picture decoding on the SPU data, the producing step (a) comprising:

performing sub-picture decoding on the SPU data and producing sub-picture pixel data in the form of corresponding color codes; and converting the color codes into a plurality of color components in a video signal format, wherein the decoded SPU data is produced in the form of the color components;

(b) outputting combined video data by mixing the main picture data and the decoded SPU data;

(c) storing the combined video data to a buffer; and (d) receiving the combined video data outputted by the step (b) and reading previously combined video data from the buffer, and generating the new video data by performing an interpolation operation according to the aspect ratio, the combined video data, and the previously combined video data.

11. The method according to claim 10, wherein in the step (a) the color codes are converted into a plurality of color components in a component video signal format.

12. The method according to claim 10, wherein the digital video decoding is digital video disk (DVD) decoding, and the main picture data and the SPU data are from a digital video disk.

13. The method according to claim 10, wherein in the step (d), the new video data is generated by the interpolation operation using a weighted sum of the combined video data outputted by the step (b) and the previously combined video data read from the buffer, and the combined video data and the previously combined video data have respective weighs that are adjustable according to the aspect ratio.

14. The method according to claim 13, wherein in the step (b), the combined video data is outputted according to a weighted sum of the main picture data and the decoded SPU data, and the main picture data and the decoded SPU data have respective weighs that are adjustable.

* * * * *